(No Model.)
R. HOFFMEISTER.
BRAKE AND FOOT REST FOR BICYCLES.
No. 600,534. Patented Mar. 15, 1898.
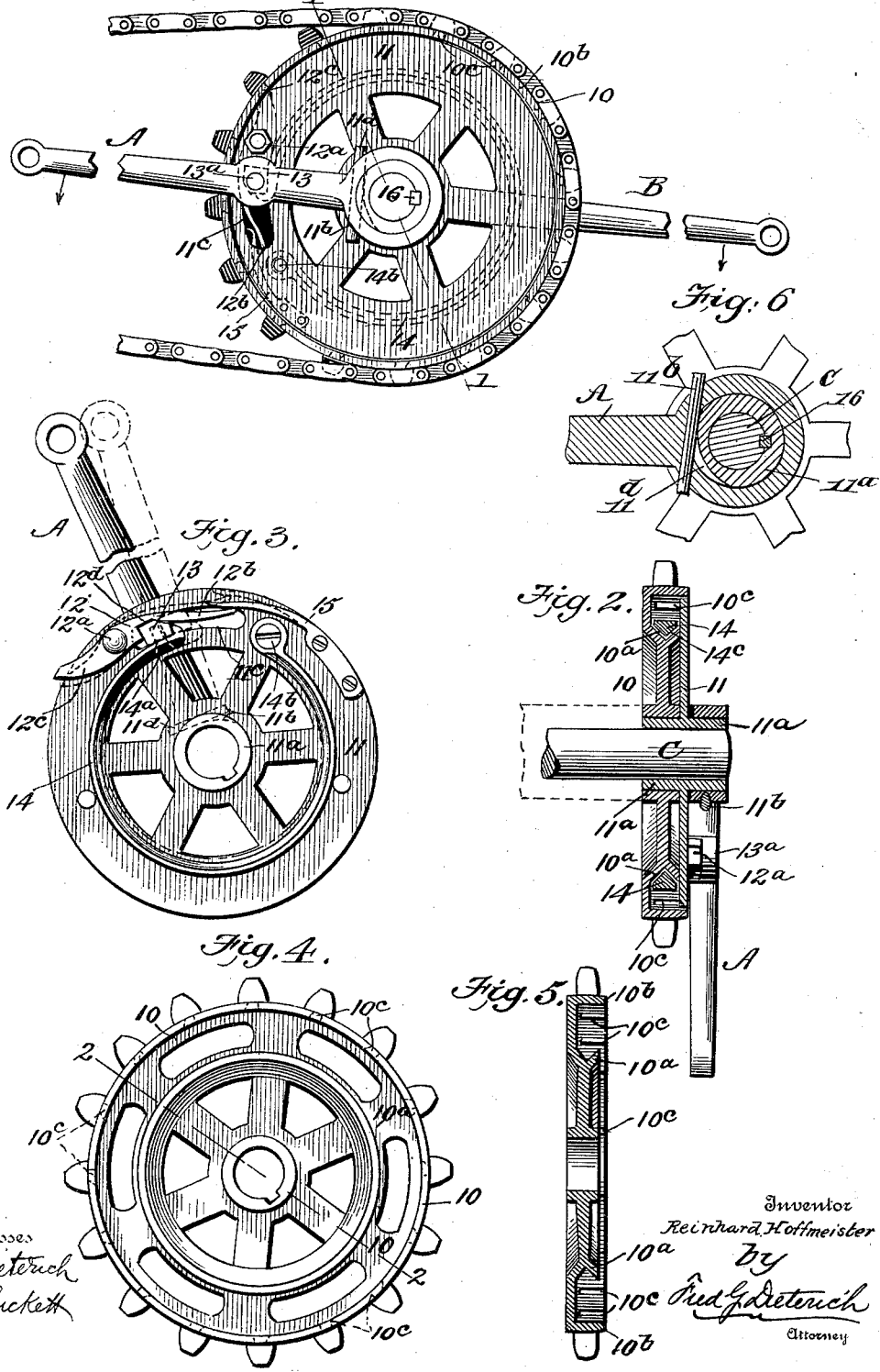
Witnesses
A. E. Dieterich
J. E. Luckett
Inventor
Reinhard Hoffmeister
by
Fred J. Dieterich
Attorney

UNITED STATES PATENT OFFICE.

REINHARD HOFFMEISTER, OF VANCOUVER, CANADA.

BRAKE AND FOOT-REST FOR BICYCLES.

SPECIFICATION forming part of Letters Patent No. 600,534, dated March 15, 1898.

Application filed March 27, 1897. Serial No. 629,630. (No model.)

*To all whom it may concern:*

Be it known that I, REINHARD HOFFMEISTER, a citizen of the Dominion of Canada, residing at Vancouver, in the Province of British Columbia, Canada, have invented a new and useful Improvement in a Combined Brake and Foot-Rest for Bicycles, of which the following is a specification.

My invention relates to brakes and foot-rests for bicycles; and its special objects are, first, to provide a means that is simple and perfectly safe whereby the rider may rest his feet when the pedals are in any position he desires and retain them so by the gentle back pressure of either one, and by throwing the weight on both pedals simultaneously the brake is set at pleasure; second, to so arrange the mechanism that the sprocket-wheel will be very little, if any, heavier than the ordinary one by placing the rack-and-pawl mechanism as far as possible from the axis of the said wheel and thus reduce the strain, and consequently the weight of parts required therein, to a minimum, and, third, to provide a brake that will give the best possible results by arranging it as near the outer rim of the sprocket-wheel as possible, and by having it of obtuse-angled form it not only has more bearing-surface, but is more easily applied, as will be seen from the following description.

The above objects I attain by the mechanism illustrated in the accompanying drawings, in which—

Figure 1 shows a plan of my device, the mechanism comprising the improvement being shown in broken lines. Fig. 2 is a cross-section of the same, taken at line 1 1. Fig. 3 is an inner plan of the circular plate which actuates the sprocket-wheel and which carries the brake mechanism. Fig. 4 is a plan of the sprocket-wheel on which the mechanism in the last-mentioned figure operates; and Fig. 5 is a cross-section of the same, taken at the line 2 2. Fig. 6 is a detail view illustrating the manner of connecting the crank to the hub of the disk 11.

In the drawings similar numerals and letters designate corresponding parts throughout the several views, referring to which—

10 indicates a wheel having the ordinary sprocket-teeth upon its periphery, and at some distance toward its axis is a second or internal rim $10^a$, a deep circular recess or opening lying on one side of the wheel between this and the outer rim $10^b$. (See Fig. 5.) The periphery of this inner rim $10^a$ is of obtuse-angled form for a purpose to appear, and on the inner periphery of the outer rim $10^b$ are notched teeth or recesses $10^c$. To prevent these recesses from weakening the said rim of the wheel, and thus necessitating its construction being much heavier, I place one opposite each sprocket-tooth, which does not in any way reduce the strength, but rather reduces the weight, which is an important consideration.

Securely fixed upon the shaft C by a feather 16 or other means is a circular plate or disk 11. This plate 11 is provided at its hub or center with a cylinder $11^a$, which projects to about equal distances on either side, the one end receiving and furnishing a suitable bearing for the wheel 10 and the other end for the crank-hub A, which is loosely held thereon for a limited backward movement, it having a transverse pin $11^b$, which engages a semi-elliptical groove $11^d$, cut in one face of the crank-hub bearing portion of the plate 11, as clearly shown by dotted lines in Figs. 1, 2, and 3, the purpose of such limited free movement of the crank being explained farther on.

As shown in Fig. 3, 12 represents a pawl pivotally fixed to the plate 11 by a pin or bolt $12^a$. This pawl 12 is provided at one end with a tapering portion $12^b$, which deflects inwardly, and its opposite end has a curvature or deflection outwardly, as $12^c$, which when engaged by the wheel 10 the said pawl $12^c$ rests in one of the notches $10^c$, (see Fig. 1,) and near the center of the said pawl on the inner side a recess $12^d$ is provided. This recess $12^d$ receives a stout pin or stop 13, having right-angled shoulders on one side, which bear against like shoulders on the said pawl, and when pressure is imparted in the direction of the arrow the sprocket-wheel 10 will be rotated by the pawl 12, and by reason of the stop or pin 13 passing through a slot $11^c$ in the plate 11 and being securely fixed to the pedal-crank A by a screw $13^a$ it will be seen that when back pressure is brought to bear on such pedal-crank, as shown by the arrow, the plate 11 will be retained from rotary motion and the sprocket 10 will be allowed to revolve, and consequently the machine will proceed onward with the pedals stationary.

14 indicates a resilient band which almost describes a circle, it being arranged around and at some distance from the projecting end of the cylinder $11^a$ on the plate 11. The one end of the said band is secured to the stop or pin 13 by a countersunk screw $14^a$, and to receive the main strain the end is turned over the stop 13, (see Fig. 3,) and the opposite end of the said band is secured to the plate 11 by a bolt or stout screw $14^b$. The above band 14 provides a brake, and owing to its inner side being of an obtuse-angled form, as $14^c$, (see Fig. 2,) contacting with the angled groove on the periphery of the inner rim $10^a$ of the wheel 10, an excellent friction-brake is provided, it being clear that a surface of angle shape offers more bearing-surface than a plain band of the same width, and therefore a greater gripping contact is obtained, as slight pressure tends to wedge the said band into the grooved recess, and thus offers more resisting power than would be possible to obtain from a plain band on a hub of uniform periphery.

To prevent the loosely-mounted pedal A from being entirely free and allowing the pawl 12 to drop from contact with the recesses $10^c$ on the inner periphery of the wheel 10, I provide the spring 15, which is secured to the edge of the said plate 11, and its resilient end bears upon the outer side of the inwardly-deflected end of the pawl 12, as $12^b$, and this has the effect of throwing the stop 13 into the recess $12^d$, which should be a snug fit to prevent the pedal-crank A from having a rattling motion, and it will be seen that when the stop 13 is nested in the said recess $12^d$ the pawl end $12^c$ will be resting in one of the recesses in the rim of the wheel 10, and by the pressure on the opposite end offered by the spring 15 the said pawl will retain its position therein, the end thereof occupying all of the space, as in the recess $12^d$ vibratory movement is prevented except when back pressure is offered by either of the pedals. The pedal-crank B is securely fixed to the shaft C, which is secured to the cylinder or hub $11^a$, as before mentioned.

In the operation of my invention the rider may stop the action of the pedals by a back pressure on either pedal, as the engaging pawl is operative but one way. The pedal on the crank A is the proper one, however, as back pressure on the pedal B will stop the crank-shaft without lifting the pawl $12^c$ from engagement with the inner side of the rim $10^b$, and the recess $10^c$ therein will rattle over the pawl. Back motion on the pedal-crank A will force the stop 13 from the recess $12^d$ in the pawl, and consequently will throw the engaging pawl $12^c$ clear of the inner rim of the wheel 10, as shown in Fig. 3.

When it is desirous to set the brake, the pedals are retained horizontally, and the rider will have perfect control over the machine on almost any declivity, as pressure on both pedals will draw the band 14 into contact with the groove in the rim $10^a$ on the wheel 10. It is clear that when weight is employed to brake the machine a lifting motion on the handles will add to that weight in proportion to the strength of the rider, and by weight and strength combined the machine will be stopped within a few feet of the first application of the brake.

The art of braking and controlling a bicycle on a steep declivity, where such brake is connected with the pedals and such pedals are fixed and rotated by the chain connected with the rear wheel, is sometimes dangerous, for should the rider lose the pedals he has lost control of the machine, which each moment is gaining in speed, and it is then a dangerous task to control the wheel until the pedals may be again secured, whereas with my device it matters not how swiftly the rider is descending the pedals are retained by the feet, as the recesses $10^c$ will slide onward over the pawl, and when required the brake is applied at pleasure. Should the pedals be released, there is no danger in thrusting the feet into the circles being described by the pedals, as the least back pressure will stop them, for the reason they are not fastened and subject to forward motion.

I am aware that prior to my invention brakes on bicycles have been operated by the pedals by means of a band on the sprocket-wheel engaging a fixed hub on the bearings of the frame, and also a stop-motion brake has been applied by a band on the disk fixed to the crank-shaft and engaging a band on a loose sprocket, the said band having recesses which engage a slidable pawl on the fixed disk, which resists motion on one of the pedals both ways. Therefore I do not claim such a device.

Having now described my invention, what I claim is—

1. In a brake and foot-rest for bicycles, the combination of a sprocket-wheel loosely mounted in close proximity to a circular plate having a cylindered hub which is rigidly secured on a crank-shaft, of a deep circular recess around and near the rim of the said wheel on the side next the plate, an obtuse-angled groove around one side of the said recess and of notches directly beneath the sprocket-teeth on the other, of an obtuse-angled spring encircling the said groove the one end being rigidly fixed to the said plate and the other end having a stop passing through a slot therein and secured to a loose pedal-crank on the opposite side of the plate, and of a pawl pivoted to the plate the end of which engages in the notches opposite the sprocket-teeth whereby the said sprocket may be forced one way, substantially as specified.

2. In an improved foot-rest and brake for bicycles, the combination of an obtuse-angled spring secured to a fixed circular plate, a pawl pivotally fixed near the rim of the said plate, a spring 15 engaging the end of the said pawl, whereby its opposite end is normally positioned beyond the edge of the said plate, of a stop 13 connecting the loose end of the spring 14 and a loosely-mounted pedal-crank through a slot in the side of the plate, of a sprocket-wheel 10 loosely mounted having a deep circular recess around and near its rim which receives the spring 14 and the pawl 12 having the recess $12^d$ wherein the stop 13 is nested, so that when forward motion is imparted to the pedal-cranks the pawl will be engaged in the notches $10^c$ and force the wheel forward, and when back pressure is applied on either pedal the wheel will slide round unrestrained, substantially as specified.

REINHARD HOFFMEISTER.

Witnesses:
W. S. TRETHEWEY,
JOHN H. JACKSON.